United States Patent
Deshpande et al.

(10) Patent No.: US 10,100,812 B2
(45) Date of Patent: Oct. 16, 2018

(54) METHODS AND SYSTEMS TO OPERATE A WIND TURBINE SYSTEM

(71) Applicant: General Electric Company, Schenectady, NY (US)

(72) Inventors: Ameet Shridhar Deshpande, Schenectady, NY (US); Pranav Agarwal, Guilderland, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 905 days.

(21) Appl. No.: 14/319,512

(22) Filed: Jun. 30, 2014

(65) Prior Publication Data

US 2015/0377216 A1    Dec. 31, 2015

(51) Int. Cl.
*F03D 7/04* (2006.01)
*F03D 7/02* (2006.01)

(52) U.S. Cl.
CPC ............ *F03D 7/045* (2013.01); *F03D 7/0224* (2013.01); *F05B 2260/74* (2013.01); *F05B 2260/821* (2013.01); *F05B 2270/1011* (2013.01); *F05B 2270/309* (2013.01); *F05B 2270/327* (2013.01); *F05B 2270/404* (2013.01); *Y02E 10/723* (2013.01)

(58) Field of Classification Search
CPC ......... F03D 7/042; F03D 7/045; F03D 7/0224
See application file for complete search history.

(56) References Cited

U.S. PATENT DOCUMENTS

| | | | |
|---|---|---|---|
| 4,462,753 A | 7/1984 | Harner et al. | |
| 7,004,724 B2 | 2/2006 | Pierce et al. | |
| 7,420,288 B2 | 9/2008 | Calley | |
| 8,210,811 B2 * | 7/2012 | Loh | F03D 7/0224 416/1 |
| 8,217,524 B2 | 7/2012 | Nakashima et al. | |
| 8,301,310 B2 | 10/2012 | Nim | |
| 8,353,667 B2 | 1/2013 | Hoffmann | |
| 8,450,867 B2 | 5/2013 | Fukami et al. | |

(Continued)

FOREIGN PATENT DOCUMENTS

| | | |
|---|---|---|
| EP | 2535574 A1 | 12/2012 |
| GB | 2459159 A | 10/2009 |

(Continued)

OTHER PUBLICATIONS

Henriksen., "Nonlinear Model Predictive Control of a Simplified Wind Turbine", 18th IFAC World Congress Milano (Italy) Aug. 28-Sep. 2, 2011, pp. 551-556.

(Continued)

*Primary Examiner* — Woody Lee, Jr.
*Assistant Examiner* — Cameron Corday
(74) *Attorney, Agent, or Firm* — GE Global Patent Operation; Nitin Joshi (57) ABSTRACT

A wind turbine system is presented. The wind turbine system includes a wind turbine tower, a plurality of blades, a rotor supported by the wind turbine tower and rotatably coupled to the plurality of blades, a torque control device coupled to the rotor, and a control system programmed to predict an over-speeding time T of an occurrence of an over-speed rotor event based at least in part upon a current rotor acceleration and a current rotor speed, that cannot be compensated by an available counter-torque margin of the torque control device, and, in response, to generate pitch commands for the pitch angles of the plurality of blades to avoid the over-speed rotor event.

19 Claims, 5 Drawing Sheets

(56) References Cited

U.S. PATENT DOCUMENTS

| | | | |
|---|---|---|---|
| 2011/0142620 A1 | 6/2011 | Loh et al. | |
| 2011/0158805 A1 | 6/2011 | Miranda et al. | |
| 2012/0009062 A1 | 1/2012 | Ingram et al. | |
| 2012/0078518 A1* | 3/2012 | Krishna | G06Q 10/04 702/3 |
| 2012/0139240 A1 | 6/2012 | Otamendi et al. | |
| 2012/0193918 A1 | 8/2012 | Mascarell et al. | |
| 2013/0214535 A1 | 8/2013 | Brath | |
| 2013/0259686 A1* | 10/2013 | Blom | F03D 7/0276 416/1 |
| 2014/0003936 A1 | 1/2014 | Agarwal et al. | |

FOREIGN PATENT DOCUMENTS

| | | |
|---|---|---|
| WO | 2007086930 A2 | 8/2007 |
| WO | 2008048270 A1 | 4/2008 |
| WO | 2010022735 A2 | 3/2010 |
| WO | 2010060772 A2 | 6/2010 |
| WO | 2011023588 A2 | 3/2011 |
| WO | 2012025121 A2 | 3/2012 |

OTHER PUBLICATIONS

Senjyu., "Output Power Leveling of Wind Turbine Generator for All Operating Regions by Pitch Angle Control", Energy Conversion, IEEE Transactions on, Jun. 2006,pp. 467-475, vol. 21, Issue: 2, ISSN: 0885-8969.

Pao et al., "Control of Wind Turbines", IEEE Control Systems, IEEE, vol. No. 31, Issue No. 2, pp. 44-62, Apr. 1, 2011.

European Search Report and Opinion issued in connection with corresponding EP Application No. 15171870.7 dated Nov. 26, 2015.

\* cited by examiner

METHODS AND SYSTEMS TO OPERATE A WIND TURBINE SYSTEM

BACKGROUND

Wind turbines are increasingly gaining importance as renewable sources of energy generation, and wind turbine technology has increasingly been applied to large-scale power generation applications. Maximizing energy output while minimizing loads of the wind turbines in varied wind conditions is a challenge that exists in harnessing wind energy.

Typically, a wind turbine includes at least one rotor mounted on a housing or nacelle which is positioned on top of a truss or a tubular tower. Certain wind turbines, designed to provide electrical power to utility grids, include large rotors with diameters extending 80 or more meters. Each of these rotors includes one or more blades. The rotor blades transform the wind energy into rotational energy which drives a generator operationally coupled to the rotor. The generator may be coupled to the rotor either directly or via a gearbox. The gearbox is used for stepping up the inherently low rotational speed of the rotor so that the generator may efficiently convert the rotational energy into electrical power.

Under certain conditions such as an increase in wind speed or a failure of wind turbine components, the rotor of a wind turbine may rotate faster than under normal conditions. If unchecked, the rotor could continue to accelerate until internal forces and resonances cause instability—a phenomenon known as over speeding. To avoid over speeding, modern wind turbines have mechanisms, such as pitch angle controls, for controlling rotor speeds. Furthermore, at least some known wind turbines also include braking systems to satisfy safety requirements. For example, some known wind turbines may include a disk brake to facilitate stopping the wind turbine rotor against full wind torque and/or stored energy sources such as hydraulic accumulators or capacitors to enable braking during power failure.

However, under certain circumstances, there may be a loss of counter torque from the generator for controlling the rotor speed. In other circumstances, there may be a failure during feathering of one or more of the rotor blades. Under such circumstances, the wind turbine may be subjected to over-speeding unless aggressive braking techniques are employed. Aggressive braking techniques may cause mechanical loading of the wind turbine.

Therefore, there is a need for an enhanced method and system for avoiding over speeding of wind turbines.

BRIEF DESCRIPTION

In accordance with one embodiment, a wind turbine system includes a wind turbine tower, a plurality of blades, a rotor supported by the tower and rotatably coupled to the plurality of blades, a torque control device coupled to the rotor, and a control system programmed to predict an over-speeding time T of an occurrence of an over-speed rotor event based at least in part upon a current rotor acceleration and a current rotor speed, that cannot be compensated by an available counter-torque margin of the torque control device, and, in response, to generate pitch commands for the pitch angles of the plurality of blades to avoid the over-speed rotor event.

In accordance with another embodiment, a method of operating a wind turbine includes predicting an over-speeding time T of an occurrence of an over-speed rotor event of the wind turbine, based at least in part upon a current rotor acceleration and a current rotor speed, that cannot be compensated by an available counter-torque margin of the torque control device, and, in response, generating pitch commands for the pitch angles of the plurality of blades to avoid the over-speed rotor event.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "control system" or "controller" may include either a single component or a plurality of components, which are either active and/or passive and are connected or otherwise coupled together to provide the described function or functions.

Figure 1:
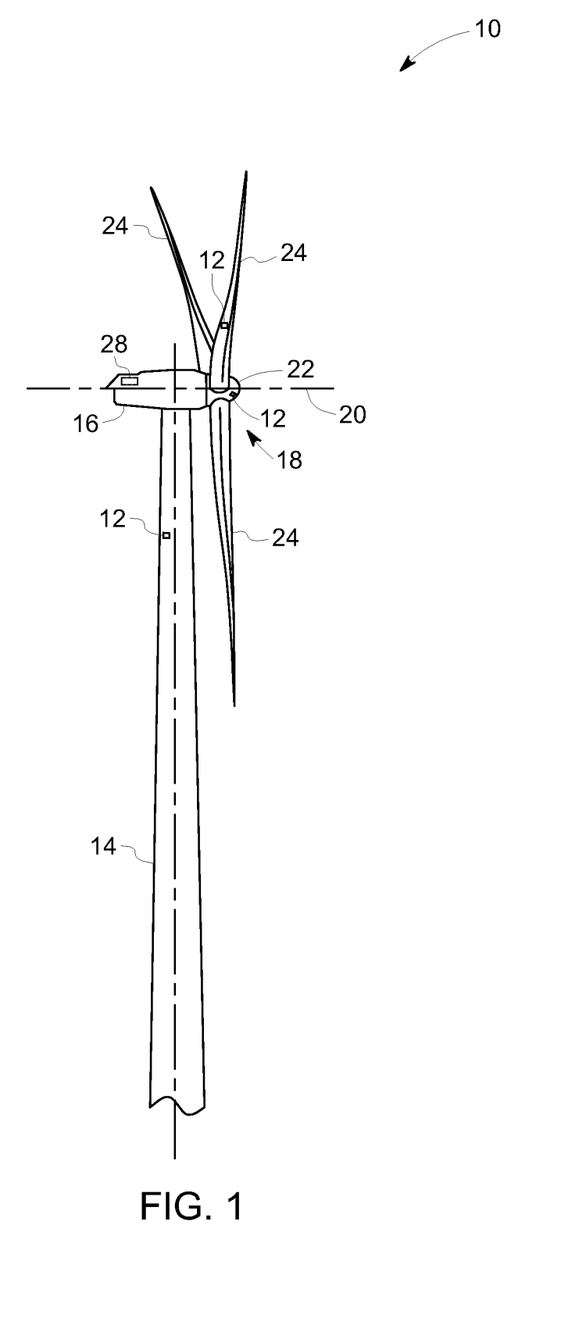
FIG. 1 is a perspective view of an exemplary embodiment of an exemplary wind turbine.

FIG. 1 is an exemplary representation of a wind turbine 10. Although the wind turbine 10 illustrated for purposes of example is a horizontal-axis electrical power generating wind turbine, in some embodiments, the wind turbine 10 may comprise a vertical-axis configuration and/or a wind mill type wind turbine (not shown). The wind turbine 10 may be coupled to a power grid (not shown) for receiving electrical power therefrom to drive operation of the wind turbine 10 and/or its associated components and/or for supplying electrical power generated by wind turbine 10 thereto. Although only one wind turbine 10 is shown, in some embodiments, a plurality of wind turbines 10 may be grouped together such that the group may be referred to as a "wind farm."

The wind turbine 10 includes a tower 14, a body 16 (sometimes referred to as a "nacelle") and a rotor 18 coupled to the body 16 for rotation with respect to the body 16 about an axis of rotation 20. The rotor 18 includes a hub 22 and one or more blades 24 extending radially outwardly from the hub 22 for converting wind energy into rotational energy. Although the rotor 18 is described and illustrated herein as having three blades 24, the rotor 18 may have any number of blades 24. The length of the blades 24 may vary depending on the application. In some embodiments, the rotor 18 generally faces upwind to harness the wind energy. In certain other embodiments, the rotor 18 faces downwind to harness the wind energy. In some embodiments, the rotor 18 may not face exactly upwind or downwind, but may be inclined generally at any angle (which may be variable) with respect to a direction of the wind to harness energy therefrom.

The rotor 18 may include the blades 24 of any shape, type, and configuration. For example, based on the shape, type, and configuration of the blades 24, the rotor 18 may include a ducted rotor, a darrieus wind turbine rotor, a savonious wind turbine rotor, a traditional windmill rotor, or the like. The traditional windmill rotor, for example may be for pumping water, such as, but not limited to, four-bladed rotors having wooden shutters and/or fabric sails.

The wind turbine 10 further includes one or more sensors 12 coupled to one or more components of the wind turbine 10 and/or the power grid, for measuring one or more parameters of such components. The sensors 12 may include, but are not limited to, sensors configured to measure current rotor speed, current rotor acceleration, current pitch angles of one or more of the blades 24, displacements, yaw, moments, strain, stress, twist, damage, failure, rotor torque, an anomaly in the power grid, generator speed, and/or an anomaly of power supplied to any component of the wind turbine 10.

The wind turbine 10 further includes one or more control systems 28 coupled to the sensors 12 and at least some of the components of wind turbine 10 for generally controlling operation of wind turbine 10. In the presently contemplated configuration, the control system 28 is disposed within the wind turbine 10. However, additionally or alternatively, the control system 28 may be remote from the wind turbine 10 and/or other components of the wind turbine 10. The control system 28 may be used for overall system monitoring and control including, for example, blade pitch and speed regulation, high-speed shaft and yaw brake applications, yaw and pump motor applications, and/or fault monitoring. Alternative distributed or centralized control architectures may be used in some embodiments.

Figure 2:
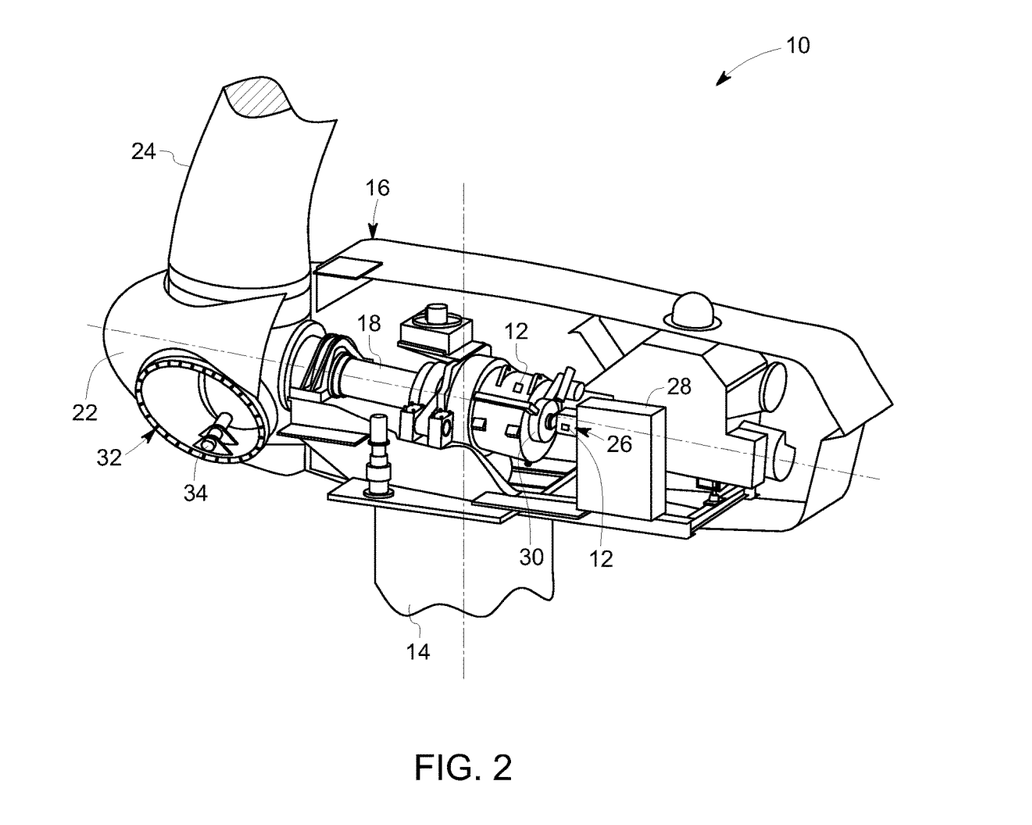
FIG. 2 is a partial-cut away perspective view of a portion of the wind turbine shown in FIG. 1.

FIG. 2 is a partial-cut away perspective view of a portion of the wind turbine 10 shown in FIG. 1. The wind turbine 10 includes one or more torque control devices. The torque control devices may include a converter, for example, an electrical generator, a battery storage device, and/or a shunt resistor load. In one specific embodiment, the torque control device comprises an electrical generator 26 coupled to the rotor 18. In one embodiment, the electrical generator 26 is coupled to the rotor 18 via a gearbox (not shown). The electrical generator 26 may be any suitable type of electrical generator, such as, but not limited to, a wound rotor induction generator. In some embodiments, the wind turbine 10 may include a brake 30 such as, for example, a hydraulic parking brake, an electromechanical brake, a centrifugal brake, an Eddie-current brake (retarder), or a magnetic brake, for braking rotation of the rotor 18 to, for example slow rotation of the rotor 18, brake the rotor 18 against full wind torque, and/or reduce the generation of electrical power from the electrical generator 26.

The wind turbine 10 may further include a pitch control device, such as, a variable blade pitch system 32 for selectively controlling a pitch angle of the blades 24. In some embodiments, the pitch angles of the blades 24 are individually controlled by the variable blade pitch system 32. The variable blade pitch system 32 may include one or more actuators 34 coupled to the hub 22 and the blades 24 for changing the pitch angle of the blades 24. The actuators 34 may include but are not limited to, electrical motors, hydraulic cylinders, springs, and/or servo-mechanisms and may be driven by any suitable means, such as, but not limited to, hydraulic fluid, electrical power, electro-chemical power, and/or mechanical power. Additionally or alternatively, the actuators 34 may be driven by energy extracted from rotational inertia of the rotor 18, and/or a stored energy source (not shown) that supplies power to components of the wind turbine 10 during a grid anomaly in the power grid coupled to wind turbine 10.

As previously noted with reference to FIG. 1, the wind turbine 10 further includes the sensors 12 and the control system 28. The control system 28, for example, may be a processing subsystem, a processor, a microprocessor, an embedded chip, or the like. The control system 28 is operationally coupled to the brake 30 and the variable pitch controller 32. As previously noted with reference to FIG. 1, the sensors 12 are positioned with respect to one or more components of the wind turbine 10 and/or the power grid, for measuring one or more parameters of such components. Although the exemplary sensors 12 are illustrated herein as coupled to various components of wind turbine 10, including the tower 14, the plurality of blades 24, and the hub 22, the sensors 12 illustrated herein are not limited to the components each sensor is shown as coupled to, nor the location shown on such components. Rather, the sensors 12 may be coupled to any component of the wind turbine 10 and/or the power grid at any location thereof for measuring any parameter thereof.

Figure 3:
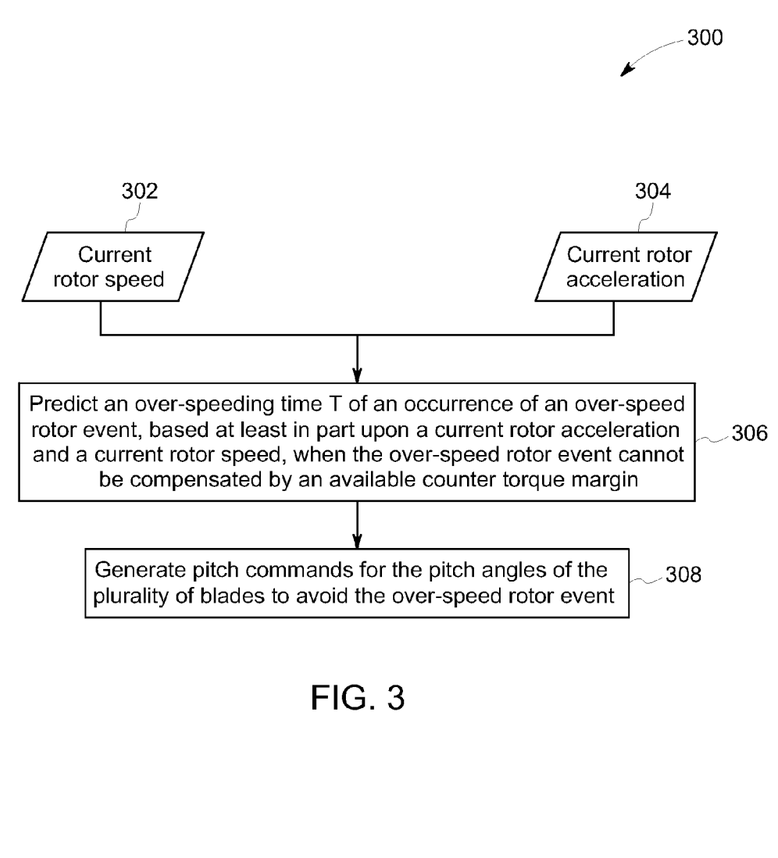
FIG. 3 is a flow chart illustrating a method to operate the wind turbine referred to in FIG. 1 and FIG. 2, in accordance with one embodiment of the present disclosure.

In one embodiment of the present invention, the control system 28 predicts an over-speeding time T of an occurrence of an over-speed event of the wind turbine 10 and then generates pitch commands for the pitch angles of the blades 24 to avoid the over-speed event. FIG. 3 is a flow chart illustrating a method 300 to operate the wind turbine 10 referred to in FIG. 1 and FIG. 2, in accordance with a more specific aspect of this embodiment. Reference numeral 302 is representative of current rotor speed, and reference numeral 304 is representative of current rotor acceleration. As previously noted, the current rotor speed 302 and the current rotor acceleration 304, for example, may be generated by the sensors 12 or may be determined based upon information sensed by the sensors 12. In one embodiment, at block 306 a prediction of an over-speeding time T of the occurrence of the over-speed rotor event may be determined based at least in part on the current rotor speed 302, current rotor acceleration 304, and an available counter-torque margin. More specifically, if there is sufficient available counter-torque margin to compensate for a potential over-speed event, that would otherwise be expected based on the current rotor speed and current rotor acceleration, the over-speeding time T is not predicted as such compensation is expected to prevent the over-speed event. The over-speeding time T applies to events that cannot be compensated by application of the available counter-torque margin In one embodiment, the available counter torque margin may be represented by the following equation (1):

$$\text{Available CounterTorquemargin} = Q_g^{max} - Q_{g0} \quad (1)$$

The over-speeding time, for example may be determined using the following equation (2):

$$T = \frac{J_r}{\partial M_Z/\partial \Omega} \ln\left(1 + \frac{\partial M_Z/\partial \Omega (\Omega^{max} - \Omega_0)}{J_r \Omega_0 - (Q_g^{max} - Q_{g0})}\right) \quad (2)$$

wherein T is the over-speeding time, $J_r$ is rotor inertia, $M_Z$ is aerodynamic torque, $\partial M_Z/\partial \Omega$ is an aerodynamic sensitivity and a change in aerodynamic torque with respect to a change in rotor speed, $\Omega^{max}$ is maximum allowable rotor speed of the rotor 18, $\Omega_0$ is current rotor speed, $\overset{\circ}{\Omega}_0$ is current rotor acceleration, $Q_g^{max}$ is the maximum available counter-torque, $Q_{g0}$ is current counter-torque. As is evident form the equation (2), the over-speeding time T may be predicted without usage of wind speed data or wind speed related estimations and, when doing so, does not contain errors that exist due to lags in wind speed measurements or estimation. Equation (2) is derived assuming that rotor speed at the over-speeding time T is substantially equal to the maximum allowable rotor speed $\Omega^{max}$.

At block 308 of FIG. 3, pitch commands are generated to avoid the over-speed rotor event. The pitch commands are generated for the pitch angles of the blades 24. In one embodiment, the pitch commands are generated based at least in part on one or more analytical transfer functions that define the dynamics of the wind turbine 10, and one or more aerodynamic sensitivities. For example, the pitch commands may be generated based upon the following analytical transfer function:

$$J_r \overset{\circ}{\Delta\Omega} = -\Delta Q_g + \frac{\partial M_z}{\partial v}\Delta v + \frac{\partial M_z}{\partial \Omega}\Delta\Omega + \frac{\partial M_z}{\partial \theta}\Delta\theta \quad (3)$$

wherein $J_r$ is rotor inertia, $$\Delta\overset{\circ}{\Omega}$$

is the change in rotor acceleration, $\Delta Q_g$ is the change in counter-torque, $\partial M_z$ is aerodynamic torque, $\delta\theta$ is change in pitch angle, $\partial v$ is change in speed of wind, $$\frac{\partial M_z}{\partial \theta}, \frac{\partial M_z}{\partial \Omega} \text{ and } \frac{\partial M_z}{\partial v}$$

are aerodynamic sensitivities, $$\frac{\partial M_z}{\partial \theta}$$

is change in the aerodynamic torque with respect to unit change in the pitch angles, $\partial v$ is change in speed of wind, $$\frac{\partial M_z}{\partial \Omega}$$

is change in aerodynamic torque with respect to unit change in rotor speed, and $$\frac{\partial M_z}{\partial v}$$

is change in aerodynamic torque with respect to unit change in speed of wind. It is noted that equation (3) also is a first order differential equation governing rotor speed of the rotor 18. In one embodiment, the pitch commands are generated based upon at least in part on determination of a minimum pitch angle alteration needed to avoid the over-speed rotor event. As used herein, the term "minimum pitch angle alteration" refers to the least amount of pitch angle alteration required in the pitch angles of the blades 24 to prevent the rotor 18 from experiencing the over-speed rotor event.

In one embodiment, the pitch commands are generated based at least in part on inertia of the rotor 18, the available counter-torque margin of the torque control device, a maximum available counter-torque of the torque control device, a maximum allowable rotor speed, or combinations thereof. The minimum pitch angle alteration, for example, may be determined using the following equation (4):

$$\theta_{add} = \frac{1}{-\partial M_z/\partial \theta}\left(\frac{\partial M_z}{\partial \Omega}(\Omega_0 - \Omega^{max}) + J_r\overset{\circ}{\Omega}_0 - (Q_g^{max} - Q_{g0})\right) \quad (4)$$

wherein $\theta_{add}$ is minimum pitch angle alteration needed to avoid the over-speed event, $M_z$ is aerodynamic torque, $\partial M_z/\partial \Omega$ is an aerodynamic sensitivity and a change in aerodynamic torque with respect to unit change in rotor speed, $\partial M_z/\partial \theta$ is another aerodynamic sensitivity and a change in aerodynamic torque with respect to unit change in pitch angle, $\Omega_0$ is current rotor speed, $\Omega^{max}$ is maximum allowable rotor speed of the rotor 18, $\overset{\circ}{\Omega}_0$ is current rotor acceleration, $Q_g^{max}$ is maximum available counter-torque, $Q_{g0}$ is current counter-torque. It is noted that the equation (4) is determined based upon an assumption or a determination that torque control devices (such as electrical generator 26) are capable of reaching the available counter-torque margin by the over-speeding time T. Furthermore, the equation (4) is derived using the analytical transfer function shown in equation (3). The pitch commands are designed to change the pitch angles of the blades 24 to achieve the minimum pitch angle alteration resulting in slow down of the rotor 18 before the occurrence of the over-speed event.

Figure 4:
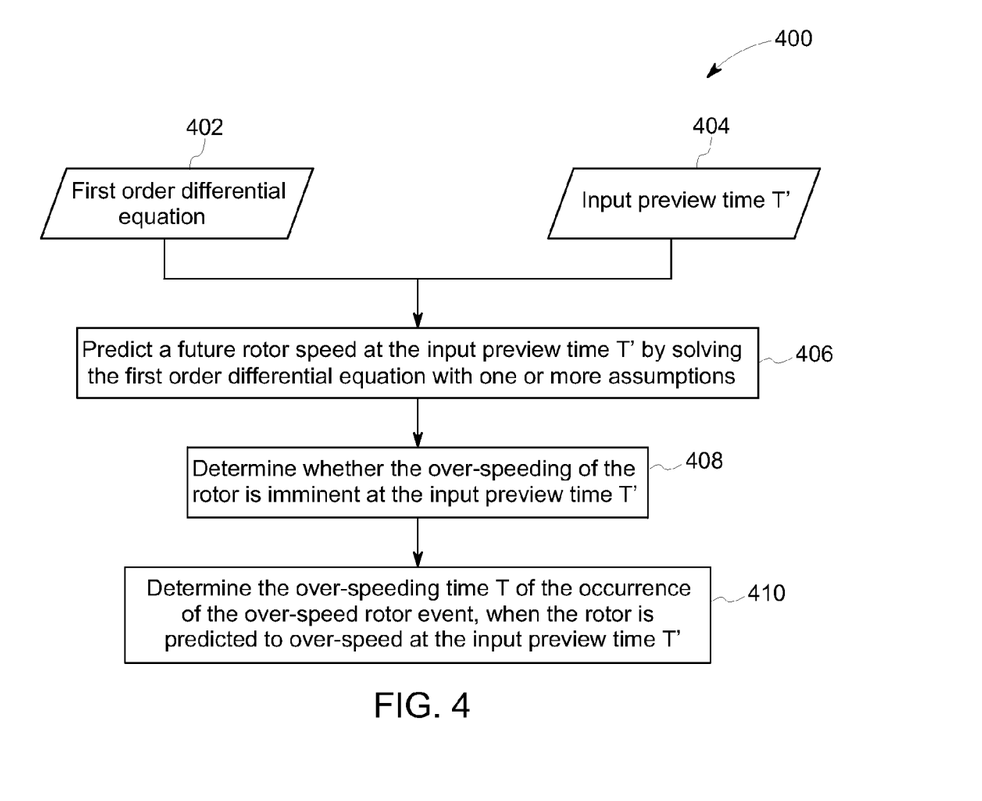
FIG. 4 is a flow chart illustrating a method to predict an over-speeding time, in accordance with one embodiment of the present disclosure.

FIG. 4 is a flow chart illustrating a method 400 to predict an over-speeding time T, in accordance with one embodiment of the present disclosure such as represented by block 306 of FIG. 3, for example. Reference numeral 402 is representative of first order differential equation governing rotor speed of the rotor 18. The first order differential equation 402, for example, may be the equation (3). The first order differential equation 402, such as the equation (3) is true for any time interval. For example, the first order differential equation 402 may be applied between a current time 0 seconds and a future time t seconds. The first order differential equation 402 may be solved at any future time, if variations in wind speed, counter-torque of the electrical generator 26 and pitch angle of the blades 24 are known. Reference numeral 404 is representative of an input preview time T'. The input preview time T' may be a commanded time input by a user, for example. In one embodiment, the input preview time T' occurs later in time than the over-speeding time T.

At block 406, a future rotor speed at the input preview time T' may be predicted by solving the first order differential equation 402 governing the rotor 18, such as the equation (3), with one or more assumptions. The assumptions, for example, may include constant wind speed from the current time till the input preview time T' 404. When the wind speed is assumed constant from the current time till the input preview time T', the contribution of the wind speed gets removed from the first order differential equation (3) as the change in wind speed is zero. Accordingly, the future rotor speed at the input preview time T' may be predicted without usage of wind speed data or wind speed related estimations. The constant wind speed assumption makes the over speed control independent of and hence robust to any delay or lag in wind speed estimation. The assumptions may additionally or alternatively include application of available counter-torque margin of the torque control device on the rotor 18. The assumptions may further include application of maximum available counter-torque $Q_{max}$ from current time till the input preview time T'. The assumptions may additionally or alternatively include the pitch angles of the blades 24 being constant, from the current time till the input preview time T'. In one embodiment, when the electrical generator 26 can apply the maximum available counter-torque $Q_{max}$ from current time till the input preview time T', the future rotor speed may be determined using following equation (5):

$$\Omega_{T'} = \Omega_0 + \left(1 - \exp\left(-\frac{-\partial M_Z/\partial \Omega}{J_r}T'\right)\right)\frac{\left(J_r\overset{\circ}{\Omega}_0 - \left(Q_g^{max\circ}/ - Q_{g0}\right)\right)}{-\partial M_Z/\partial \Omega} \quad (5)$$

In another embodiment, when the electrical generator 26 may not be able to apply the maximum available counter-torque $Q_{max}$ from current time till the input preview time T' due to a limitation, such as, a limitation on rate of change of counter-torque, the future rotor speed may be determined using following equation (6):

$$\Omega_{T'} = \Omega_0 + \left(1 - \exp\left(\frac{-T'}{\tau}\right)\right)\tau\left(\overset{\circ}{\Omega}_0 + \mu_{max}^*\right) - \mu_{max}^* T' \quad (6)$$

wherein $$\mu_{max}^* = \frac{Q_{max}^g}{-\partial M_z/\partial \Omega}, \tau = \frac{J_r}{-\partial M_z/\partial \Omega},$$

$\Omega_{T'}$ is a future rotor speed of the rotor 18, $\Omega_0$ is current rotor speed, $M_Z$ aerodynamic torque, $J_r$ is rotor inertia, $\overset{\circ}{\Omega}_0$ is current rotor acceleration, $\partial M_z/\partial \Omega$ is a change in aerodynamic torque with respect to a change in rotor speed, $Q_g^{max}$ is maximum available counter-torque, and T' is input preview time.

At block 408, it is determined whether the over-speeding of the rotor 18 is imminent at the input preview time T'. In other words, it is predicted whether the rotor 18 may over-speed at the input preview time T'. The imminence of the over-speeding of the rotor 18 may be determined by comparing the future rotor speed to a maximum allowable rotor speed $\Omega^{max}$ of the rotor 18. For example, the rotor 18 may over speed when the future rotor speed is greater than the maximum allowable rotor speed.

At block 410, the over-speeding time T may be determined when the over-speeding of the rotor 18 at the input preview time T' is imminent. The over-speeding time T is the first time from the current time when the rotor speed reaches the maximum allowable rotor speed $\Omega^{max}$. In one embodiment, the over-speeding time T may be predicted by solving a first order differential equation governed by rotor inertia, such as the equation (3), and an assumption that wind velocity is constant, or a rate of wind speed is constant. The over-speeding time T, for example, may be determined using the equation (2). The over-speeding time may be determined based at least in part on an assumption that a rotor speed at the over-speeding time T is equal to the maximum allowable rotor speed. In one embodiment, the over-speeding time T may be predicted based at least in part on a plurality of input variable parameters comprising the available counter-torque margin of the electrical generator 26 of the wind turbine 10, and a current counter-torque of the electrical generator. In an additional or alternative embodiment, the over-speeding time T may be predicted based at least in part on the maximum allowable rotor speed, the maximum available counter-torque of an electrical generator of the wind turbine system, one or more aerodynamic sensitivities, and inertia of the rotor. The aerodynamic sensitivities may include a change in aerodynamic load with respect to a change in torque of the rotor and a change in the aerodynamic load with respect to a change in the pitch angle of the blades 24.

Figure 5:
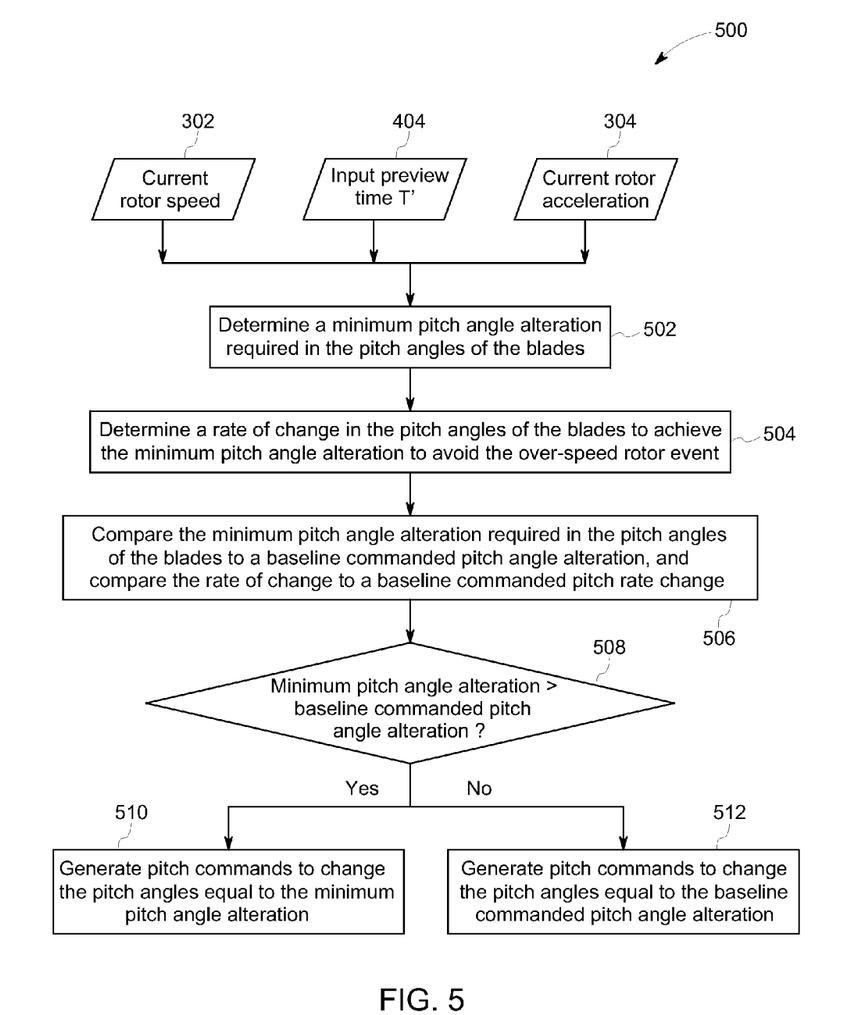
FIG. 5 is a flow chart illustrating a method to generate pitch commands for the pitch angles of blades, in accordance with one embodiment of the present disclosure.

FIG. 5 is a flow chart illustrating a method 500 of one example embodiment to generate pitch commands for the pitch angles of the blades 24 (FIG. 1), in accordance with one embodiment of the present disclosure. Therefore, FIG. 5 is executed when the over-speeding time T of the occurrence of the over-speed event is predicted. As previously noted with reference to FIG. 3, reference numeral 302 is representative of current rotor speed, reference numeral 304 is representative of current rotor acceleration, and the reference numeral 404 is representative of the input preview time T'.

At block 502, a minimum pitch angle alteration needed to avoid the occurrence of the over-speed event is determined. In one embodiment, the minimum pitch angle alteration, for example, is determined based at least in part on inertia of the rotor, the available counter-torque margin of the electrical generator 26, a maximum available counter-torque of the electrical generator 26, a maximum allowable rotor speed, or combinations thereof. Further, the minimum pitch angle alteration may be determined based on one or more analytical transfer functions (such as the analytical transfer function shown in equation (3)) that define the dynamics of the wind turbine 10, and one or more aerodynamic sensitivities. For example, the minimum pitch angle alteration may be determined using the equation (4).

Furthermore, at block 504, a rate of change in the pitch angles of the blades 24 to achieve the minimum pitch angle alteration to avoid the occurrence of the over-speed event may be determined. The rate of change in the pitch angles of the blades, for example may be determined based upon the minimum pitch angle alteration and the over-speeding time T The rate of change of the pitch angle, for example, may be determined using the following equation (7):

$$\theta_{rate} = \frac{\theta_{add}}{T} \quad (7)$$

wherein $\theta_{rate}$ is rate of change in the pitch angles of the blades 24, $\theta_{add}$ is minimum pitch angle alteration, and T is over-speeding time.

At block 506, the minimum pitch angle alteration is compared to a baseline commanded pitch angle alteration, and the rate of change is compared to a baseline commanded pitch rate change. As used herein, the term "baseline commanded pitch angle alteration" refers to those pitch angle alteration commands that are commanded by baseline operating control models or any other suitable control models and/or methods that are used for day-to-day normal operation of the wind turbine 10. Similarly, as used herein, the term "baseline commanded pitch rate change" refers to those pitch rate change commands that are commanded by baseline operating control models or any other suitable control models and/or methods that are used for day-to-day normal operation of the wind turbine 10. At block 508, when the minimum pitch angle alteration is greater than the baseline commanded pitch angle alteration, then at block 510 pitch commands are generated to change the pitch angles of the blades 24 equal to the minimum pitch angle alteration required in the pitch angle of the blades 24. When the minimum pitch angle alteration is less than the baseline commanded pitch angle alteration, then at block 512 pitch commands are generated to change the pitch angles of the blades 24 equal to baseline commanded pitch angle alteration. In one embodiment, when the rate of change is greater than the baseline commanded pitch rate change, then the pitch commands are generated to change the pitch angles of the blades 24 at the rate of change. In alternative embodiment, when the rate of change is less than the baseline commanded pitch rate change, then the pitch commands are generated to change the pitch angles of the blades 24 at the baseline commanded pitch rate change.

The pitch commands, for example, may be sent to a pitch control device, such as the variable pitch controller 32 or the actuators 34 (referred to in FIG. 2). The variable pitch controller 32 or the actuators 34 may change the pitch angles of the blades 24 as instructed by the pitch commands. The change in the pitch angles of the blades 24 reduces the rotor speed of the rotor 18 before the occurrence of the over-speed rotor event. In the above description, the same rate of change of pitch angle is applied to each blade 24. In other embodiments, if desired, different rates of change may be applied if desired so long as the final result is to prevent the occurrence of the over-speed rotor event.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine system, comprising:
 a wind turbine tower;
 a plurality of blades;
 a rotor supported by the tower and rotatably coupled to the plurality of blades;
 a torque control device coupled to the rotor; and
 a control system programmed to predict an over-speeding time T of an over-speed rotor event that cannot be compensated by an available counter-torque margin of the torque control device, and, in response, to generate pitch commands for the pitch angles of the plurality of blades to avoid the over-speed rotor event, wherein the over-speeding time T is not predicted if the available counter-torque margin compensates the over-speed rotor event, and wherein the over-speeding time T is determined by an equation:

$$T = \frac{J_r}{\partial M_Z / \partial \Omega} \ln\left(1 + \frac{\partial M_Z / \partial \Omega (\Omega^{max} - \Omega_0)}{J_r \dot{\Omega}_0 - (Q_g^{max} - Q_{g0})}\right)$$

wherein T is the over-speeding time, $J_r$ is rotor inertia, $M_Z$ is aerodynamic torque, $\partial M_Z / \partial \Omega$ is an aerodynamic sensitivity and a change in the aerodynamic torque with respect to a change in rotor speed, $\Omega^{max}$ is a maximum allowable rotor speed of the rotor, $\Omega_0$ is the current rotor speed, $\dot{\Omega}_0$ is current rotor acceleration, $Q_g^{max}$ is a maximum available counter-torque, $Q_{g0}$ is current counter-torque.

2. The wind turbine system of claim 1, wherein the control system is programmed to predict the over-speeding time T of the occurrence of the over-speed rotor event without usage of wind speed data or wind speed related estimations.

3. The wind turbine system of claim 1, wherein the control system is programmed to predict the over-speeding time T of the occurrence of the over-speed rotor event by:
 predicting a future rotor speed at an input preview time T';
 predicting whether the rotor will be over speeding at the input preview time T' by comparing the future rotor speed to a maximum allowable rotor speed; and
 when the rotor is determined to over speed at the input T', determining the over-speeding time T based at least in part on an assumption that a rotor speed at the over-speeding time T is equal to a maximum allowable rotor speed.

4. The wind turbine system of claim 3, wherein the input preview time T' is later than the over-speeding time T.

5. The wind turbine system of claim 1, wherein the pitch commands are based at least in part on a determination of a minimum pitch angle alteration needed to avoid the over-speed rotor event.

6. The wind turbine system of claim 5, wherein the control system is further programmed to, when generating the pitch commands, determine a rate of change in the pitch angles of the plurality of blades to achieve the minimum pitch angle alteration to avoid the over-speed rotor event by the over-speeding time T.

7. The wind turbine system of claim 6, wherein the control system is programmed to determine the rate of change in the pitch angles of the plurality of blades based upon the minimum pitch angle alteration and the over-speeding time T.

8. The wind turbine system of claim 1, wherein the control system is programmed to generate the pitch commands based at least in part on one or more analytical transfer functions that define the dynamics of the wind turbine system and one or more aerodynamic sensitivities.

9. The wind turbine system of claim 8, wherein the control system is further programmed to generate the pitch commands based at least in part on the rotor inertia, the available counter-torque margin of the torque control device, a maximum rated counter torque of the torque control of the wind turbine system, a maximum allowable rotor speed, or combinations thereof.

10. The wind turbine system of claim 1, wherein control system is programmed to predict the over-speeding time T of the occurrence of the over-speed rotor event based upon a first order differential equation governed by rotor inertia and an assumption that wind velocity is constant, or a rate of wind speed is constant.

11. The wind turbine system of claim 1, wherein the control system is programmed to predict the over-speeding time T based at least in part on a plurality of input variable parameters comprising the available counter-torque margin of the torque control device of the wind turbine system and a current counter-torque of the torque control device.

12. The wind turbine system of claim 1, wherein the control system is programmed to predict the over-speeding time T based at least in part on a maximum allowable rotor speed, a maximum available counter-torque of the torque control device of the wind turbine system, one or more aerodynamic sensitivities, and the rotor inertia.

13. The wind turbine system of claim 12, wherein the one or more aerodynamic sensitivities comprise a change in aerodynamic load with respect to a change in torque of the rotor and a change in the aerodynamic load with respect to a change in pitch angle of the plurality of blades.

14. A method of operating a wind turbine, comprising predicting an over-speeding time T of an occurrence of an over-speed rotor event of the wind turbine, that cannot be compensated by an available counter-torque margin of the torque control device, and, in response, generating pitch commands for the pitch angles of a plurality of blades to avoid the over-speed rotor event, wherein the over-speeding time T is not predicted if the available counter-torque margin compensates the over-speed rotor event, and wherein the over-speeding time T is determined by an equation:

$$T = \frac{J_r}{\partial M_Z/\partial \Omega} \ln\left(1 + \frac{\partial M_Z/\partial \Omega (\Omega^{max} - \Omega_0)}{J_r \dot{\Omega}_0 - (Q_g^{max} - Q_{g0})}\right)$$

wherein T is the over-speeding time, $J_r$ is rotor inertia, $M_Z$ is aerodynamic torque, $\partial M_Z/\partial \Omega$ is an aerodynamic sensitivity and a change in the aerodynamic torque with respect to a change in rotor speed, $\Omega^{max}$ is a maximum allowable rotor speed of the rotor, $\Omega_0$ is the current rotor speed, $\dot{\Omega}_0$ is current rotor acceleration, $Q_g^{max}$ is maximum available counter-torque, $Q_{g0}$ is current counter-torque.

15. The method of claim 14, wherein predicting the over-speeding time T of the occurrence of the over-speed rotor event comprises:
predicting a future rotor speed at an input preview time T' based at least in part on an assumption that the electrical generator is capable of applying the available counter-torque margin by the input preview time T';
predicting whether the rotor will be over speeding at the input preview time T' by comparing the future rotor speed to a maximum allowable rotor speed; and
when the rotor is predicted to go over speed at the input preview time T', determining the over-speeding time T based at least in part on an assumption that a rotor speed at the over-speeding time T is equal to a maximum allowable rotor speed.

16. The method of claim 14, further comprising predicting the over-speeding time T of the occurrence of the over-speed rotor event without relying on accurate measurement of wind speed data or wind speed related estimations.

17. The method of claim 14, further comprising generating the pitch commands based at least in part on one or more analytical transfer functions that define the dynamics of the wind turbine system and one or more aerodynamic sensitivities.

18. The method of claim 17, further comprising generating the pitch commands based at least in part on the rotor inertia, the available counter-torque margin of the torque control device, a maximum rated counter torque of the torque control device of the wind turbine, a maximum allowable rotor speed, or combinations thereof.

19. A wind turbine system, comprising:
a wind turbine tower;
a plurality of blades;
a rotor supported by the wind turbine tower and rotatably coupled to the plurality of blades;
a torque control device coupled to the rotor; and
a control sustem programmed to predict an over-speeding time T of an occurrence of an over-speed rotor event and a current rotor speek that cannot be compensated by an available counter-torque margin of the torque control device, and, in response, to generate picth commands for the pitch angles of the plurality of blades to avoid the over-speed rotor event, wherein the over-speeding time T is not predicted if the available counter-torque margin compensates the over-speed rotor event, wherein the control system is further preqrammed to predict the over-speeding time T based on a predicted furture rotor speed at an input preview time T', and wherein the predicted future rotor speed is determined by an equation:

$$\Omega_{T'} = \Omega_0 + \left(1 - \exp\left(-\frac{-\partial M_Z/\partial \Omega}{J_r}T'\right)\right)\frac{\left(J_r\dot{\Omega}_0 - \left(Q_g^{max}/-Q_{g0}\right)\right)}{-\partial M_Z/\partial \Omega}$$

wherein $J_r$ is rotor inertia, $M_Z$ is aerodynamic torque, $\partial M_Z/\partial \Omega$ is an aerodynamic sensitivity and a change in the aerodynamic torque with respect to a change in rotor speed, $\Omega^{max}$ is a maximum allowable rotor speed of the rotor, $\Omega_0$ is the current rotor speed, × is current rotor acceleration, $Q_g^{max}$ is a maximum available counter-torque, $Q_{g0}$ is current counter-torque.

* * * * *